United States Patent [19]

Hopkinson

[11] 4,137,450

[45] Jan. 30, 1979

[54] DUAL DETECTOR PULSED NEUTRON LOGGING FOR PROVIDING INDICATION OF FORMATION POROSITY

[75] Inventor: Eric C. Hopkinson, Houston, Tex.

[73] Assignee: Dresser Industries, Inc., Dallas, Tex.

[21] Appl. No.: 806,050

[22] Filed: Jun. 13, 1977

[51] Int. Cl.$^2$ .............................................. G01V 5/00
[52] U.S. Cl. .................................. 250/264; 250/265; 250/269
[58] Field of Search ............... 250/262, 264, 269, 270, 250/265

[56] References Cited

U.S. PATENT DOCUMENTS

| | | | |
|---|---|---|---|
| 3,379,882 | 4/1968 | Youmans | 250/264 |
| 3,491,238 | 1/1970 | Allen | 250/269 |
| 3,691,378 | 9/1972 | Hopkinson et al. | 250/264 |

Primary Examiner—Alfred E. Smith
Assistant Examiner—Janice A. Howell
Attorney, Agent, or Firm—Albert M. Crowder, Jr.

[57] ABSTRACT

A logging instrument contains a pulsed neutron source and a pair of radiation detectors spaced along the length of the instrument. The radiation detectors are gated differently from each other to provide an indication of formation porosity which is substantially independent of the formation salinity. In the preferred embodiment, the electrical signals indicative of radiation detected by the long-spaced detector are gated for almost the entire interval between neutron pulses and the short-spaced signals are gated for a significantly smaller time interval which commences soon after the termination of a given neutron burst. The signals from the two detectors are combined in a ratio circuit for determination of porosity.

20 Claims, 9 Drawing Figures

DUAL DETECTOR PULSED NEUTRON LOGGING FOR PROVIDING INDICATION OF FORMATION POROSITY

BACKGROUND OF THE INVENTION

This invention relates generally to method and apparatus for the logging of earth boreholes and particularly to method and apparatus for providing an indication of the earth formation porosity which is substantially independent of the salinity of such formations.

It is well known in the prior art to utilize a pulsed neutron source and a pair of spaced radiation detectors to provide an indication of the formation porosity. With such prior art devices, the near-spaced detector is gated on during some interval between the neutron bursts and the far-spaced detector is similarly gated on during the same gating interval between bursts. The signals from the first detector are then combined with the signals from the second detector to result in a ratio which is indicative of the formation porosity.

For example, in U.S. Pat. No. 3,379,882 to Arthur H. Youmans which issued on Apr. 23, 1968, and which is assigned to the assignee of the present application, it is disclosed with respect to FIG. 13 of that patent that the ratio is achieved by combining signals from the two detectors in a ratio circuit and specifically that the gating intervals should be identical.

Furthermore, in U.S. Pat. No. 3,621,255 to Robert J. Schwartz which issued on Nov. 16, 1971, there is disclosed a concept much like that of the aforementioned Youmans patent which is said to provide an indication of the formation porosity by producing signals from each of the detectors which are combined in ratio circuitry to provide a signal which is related to the porosity of the formation. The circuitry described in the Schwartz patent speaks of automatically adjusting the gates in the two detectors in accordance with the formation characteristics being logged but does not particularly indicate how the gates associated with one detector will relate in time to the gates associated with the other detector. FIG. 2 of that patent and its related disclosure indicate that the gates do occur some time along the curve segments 54 and 55 but otherwise is silent as to their relationship to each other.

It has been discovered, however, that when using identical gate intervals with the two detectors to provide a formation porosity ratio, the resultant ratio is highly dependent upon formation salinity.

It is therefore the primary object of the present invention to provide new and improved method and apparatus for indicating formation porosity which is substantially independent of formation salinity.

The objects of the invention are accomplished, generally, by well logging method and apparatus which utilize one gating interval for the first detector and a different gating interval for the second detector. By providing a ratio of the signals indicative of detected radiation occurring during the two gating intervals, a log is provided of the formation porosity which is substantially independent of the formation salinity. In a more specific embodiment, the short-spaced detector gating interval, while being shorter in duration than the long-spaced gating interval, does have its beginning point in coincidence with the beginning point of the long-spaced detector gating interval.

These and other objects, features and advantages of the present invention will be more readily appreciated from a reading of the following detailed specification and drawing, in which:

Figure 1:
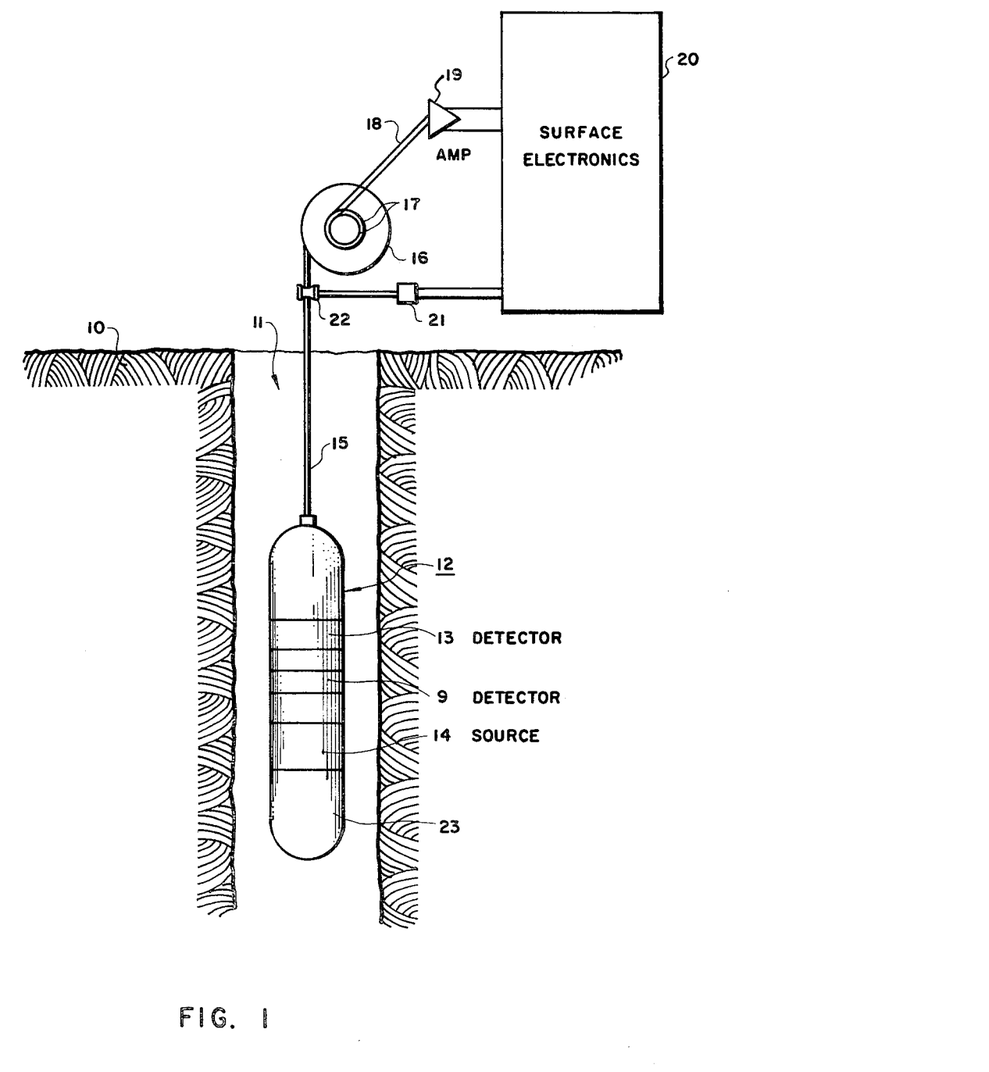
FIG. 1 is a side elevational view, partly in cross section, illustrating apparatus according to the invention, and the disposition of such apparatus relative to the strata to be examined.

Referring now to the drawing in more detail, particularly to FIG. 1, there is illustrated schematically a radioactivity well surveying operation in which a portion of the earth's surface 10 is shown in vertical section. A well 11 penetrates the earth's surface and may or may not be cased. Disposed within the well is subsurface instrument 12 of the well logging system. Subsurface instrument 12 comprises a detecting system comprised of radiation detectors 9 and 13 and a pulsed neutron source 14. Cable 15, a multiconductor cable well known in the art, suspends the instrument in the well and contains the required conductors for electrically connecting the instrument with the surface apparatus. The cable is wound on, or unwound from, drum 16 in raising and lowering the instrument 12 to traverse the well. In making a radioactivity log of a well, instrument 12 is caused to traverse the well. During the traversal, discrete bursts of high energy neutrons from source 15 irradiate the formations surrounding the borehole, and radiations influenced by the formations are detected by the detecting system comprised of detectors 9 and 13. The resultant signals are sent to the surface through cable 15. Through slip rings and brushes 17 on the end of the drum 16, the signals are conducted by lines 18 to the amplifier 19 for amplification. The amplified signals are conducted to the surface electronics 20, described hereinafter in greater detail. A recorder, for example, the recorder 100 illustrated in FIG. 6, within the electronics section 20 is driven through a transmission 21 by measuring reel 22, over which cable 15 is drawn, so that the recorder moves in correlation with depth as instrument 12 traverses the well. Amplifier 19 may be included in the subsurface instrument, or amplification may be effected both on the surface and in the subsurface instrument. It is also to be understood that the instrument housing 23 is constructed to withstand the pressures and mechanical and thermal abuses encountered in logging a deep well.

As is well known in the art of radioactivity well logging, the formation 10 is irradiated by high energy neutrons from the neutron source 14, for example, a D-T accelerator. These neutrons participate in elastic and inelastic collisions with the atoms contained in the various layers of the formation. The secondary radiation resulting from bombardment by the primary radiation in the form of neutrons from the source 14 is detected by the radiation detectors 9 and 13.

It should be appreciated that the detectors 9 and 13 are arranged in a trailing relationship to the source 14. A suitable radiation shield is preferably interposed between the source 14 and the nearest detector 9 to prevent direct irradiation of that detector. As used herein, the expression "trailing relationship" is merely intended to describe the spacing of the detectors relative to the source, and does not mean that the detectors necessarily follow the source through the borehole. It should furthermore be appreciated that, if desired, the detectors 9 and 13 can straddle the source 14.

Radiation detection systems for use in accordance with the present invention are well known in the prior art, for example, in U.S. Pat. No. 3,706,884. Although not illustrated, it should be appreciated that each of the detectors 9 and 13 will preferably include a crystal, for example, CsI or NaI, which is used as a scintillation crystal. For purposes of the present invention, it is desirable that the crystal used have an output proportional to the energy of a gamma ray photon received. A crystal of this type emits a photon of light energy when a gamma ray photon impinges upon it, and the energy of the light photon is proportional to the energy of the incoming gamma ray photon. The scintillation from such a crystal is coupled to a photomultiplier tube (not illustrated) which produces electrical pulses proportional to the intensity of the light produced by the crystal. The crystal and photomultiplier can be fabricated, if desired, according to U.S. Pat. No. 3,254,217 to Arthur H. Youmans. These signals pass to a conventional pre-amplifier stage (not illustrated). The pre-amplifier is normally connected to a discriminator (not illustrated) which is set to respond to pulses of a preselected magnitude. It should be appreciated that such a discriminator can be built in accordance with FIG. 4.1, page 204 of *Electronics, Experimental Techniques,* Elmore and Sands, published by the McGraw-Hill Book Co., Inc., in 1949.

Figure 2A:
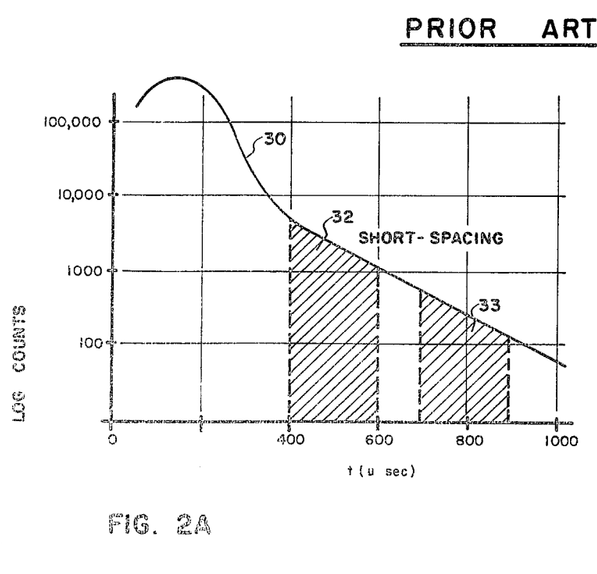
FIGS. 2A and 2B are schematic representations of the characteristic decay of the thermal neutron population following a burst of fast neutrons within a well and the prior art method of utilizing the identical gates associated with the two detectors for providing an indication of formation porosity.
Figure 2B:
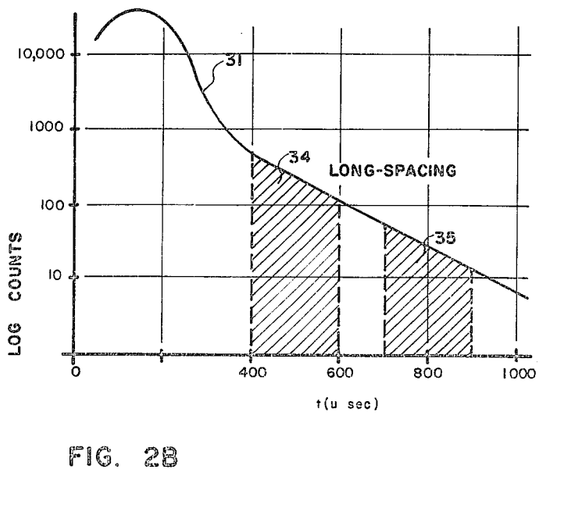

Referring now to FIGS. 2A and 2B, there is graphically illustrated a pair of representative waveforms 30 and 31 which are used to provide a porosity measurement in accordance with U.S. Pat. No. 3,379,882 to Arthur H. Youmans, such patent being assigned to the assignee of the present invention. In producing such curves, the curve 30 is representative of the decline of the thermal neutron population as measured by the short-spaced detector 9 and the curve 31 is representative of the decline of the thermal neutron population as measured by the long-spaced detector 13. With such curves, the decline of the thermal neutron population can be computed by measuring either the radiation occurring during the gates 32 and 33 or during the gates 34 and 35 illustrated beneath the curve 31 in FIG. 2B. It should be appreciated that in this prior art teaching, the gates 32 and 34 are set to coincide with each other, viz., from 400 to 600 microseconds following the burst of fast neutrons. In a similar manner, the gates 33 and 35 coincide and occur between 700 and 900 microseconds following each neutron burst. In the teaching of U.S. Pat. No. 3,379,882, it is shown that the ratio of the radiation occurring in the gate 32 to the radiation occurring in the gate 34 will produce an indication of porosity of the formations. In a similar manner, the ratio of the detected radiation occurring during gate 33 and the radiation occurring during gate 35 can also be used. In any event, the teaching of U.S. Pat. No. 3,379,882 is such that the gates are set to be identical in the two detectors. Although such a ratio can be used to provide an indication of porosity under certain conditions, under other conditions formation salinity may create problems when the gates of one detector are set to coincide with the gates of the other detector.

Figure 3A:
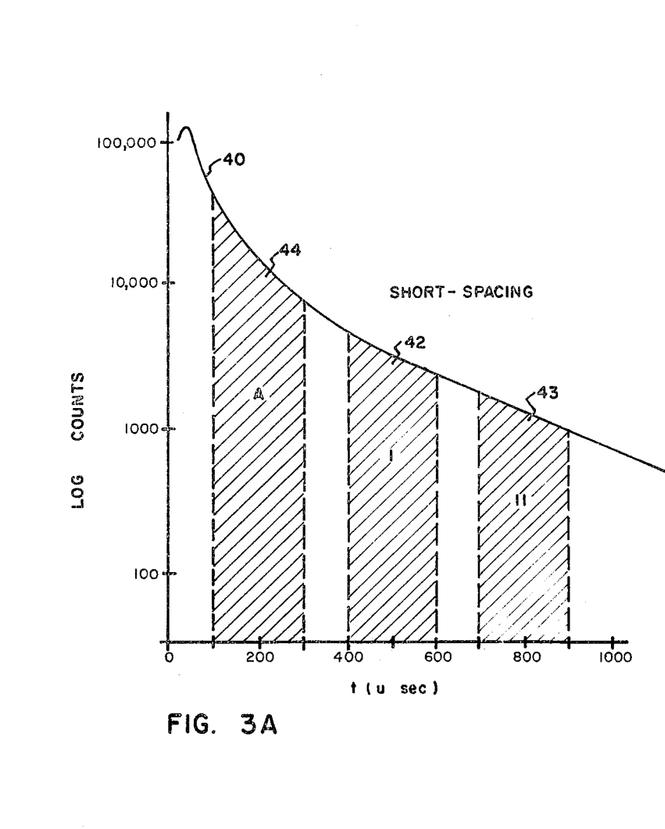
FIGS. 3A and 3B are schematic representations of the characteristic decay of the thermal neutron population following a burst of fast neutrons within a well and the gating intervals used in conjunction with the short-spaced and long-spaced detectors, respectively, in accordance with the present invention.
Figure 3B:
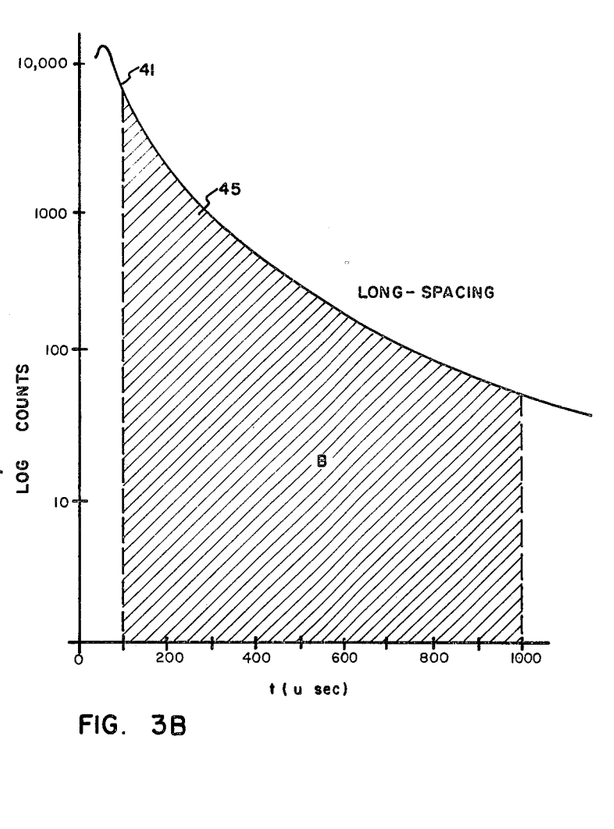

Referring now to FIGS. 3A and 3B, there is graphically illustrated waveforms 40 and 41 which have been found to overcome the problems associated with formation salinity. The waveform 40 illustrates that the gates 1 and 2, shown generally by the numerals 42 and 43, coincide exactly with the gates 32 and 33 of FIG. 2A. In addition, the gate A, shown generally by the reference numeral 44, is set to occur during the interval of 100 to 300 microseconds after the occurrence of the neutron burst. It should be appreciated that the curve 40 is representative of the decline of the thermal neutron population as detected by the short-spaced detector 9.

FIG. 3B illustrates the curve 41 which is representative of the decline of the thermal neutron population as detected by the detector 13 and includes a gate B, shown generally by the reference numeral 45, which is set to include a detection interval occurring between 100 and 1000 microseconds following the termination of the neutron burst. It should be appreciated that the neutron source pulses are preferably set to occur at intervals separated by 1000 microseconds, and the duration of the gate 45 can be set, if desired, to terminate immediately prior to the beginning of the next neutron source pulse.

Figures 4A, 4B:
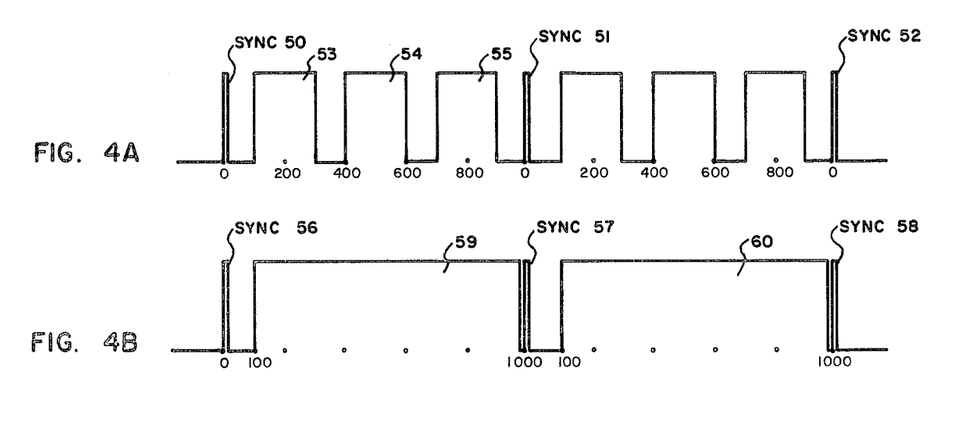
FIGS. 4A and 4B graphically illustrate the representative sync pulses and gate intervals used in accordance with the present invention.
Figure 5:
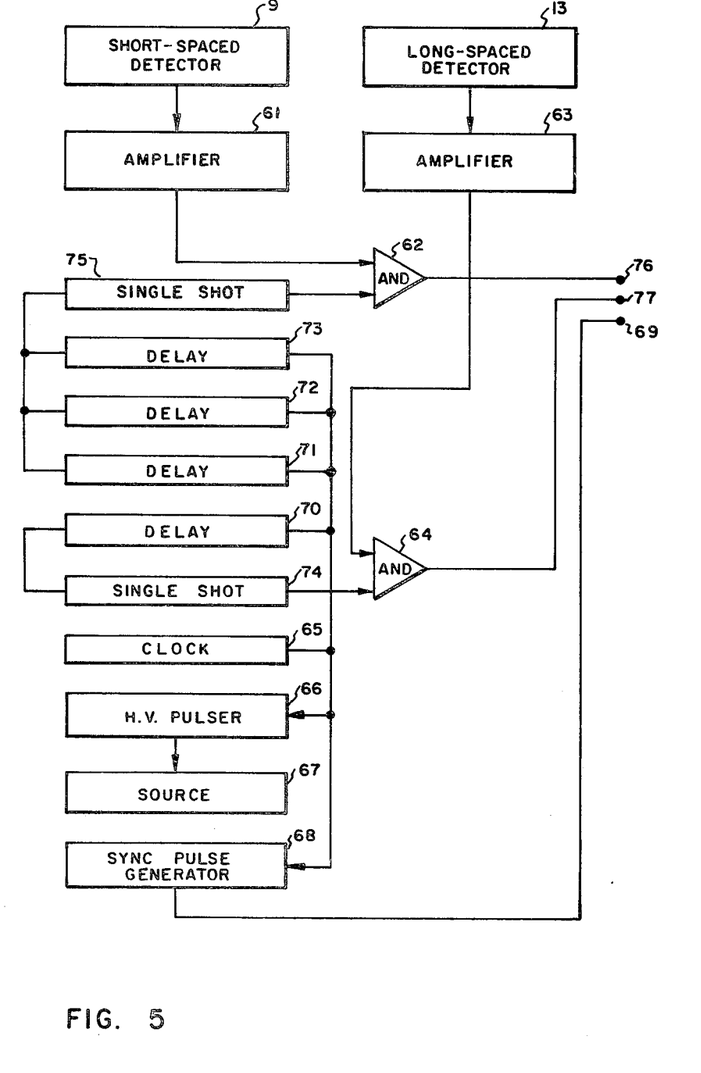
FIG. 5 illustrates in block diagram the subsurface circuitry in accordance with the present invention.

Referring now to FIGS. 4A and 4B, there is graphically illustrated the representative sync and gate pulses which enable the circuitry of FIG. 5, illustrated hereinafter, to measure the radiation occurring in the gates illustrated in FIG. 3A and FIG. 3B. The sync pulses 50, 51 and 52 of FIG. 4A coincide with the discrete bursts of high energy neutrons and occur 1000 microseconds apart. The gate pulse 53 is set to occur between 100 and 300 microseconds following the sync pulse 50. The gate pulse 54 occurs between 400 and 600 microseconds following the sync pulse 50, and the gate pulse 55 occurs between 700 and 900 microseconds following the sync pulse 50. Similar such gating pulses occur subsequent to the sync pulse 51 and the sync pulse 52. It should be appreciated that the sync pulses 50, 51 and 52 and the gate pulses 53, 54 and 55 are used with the electrical signals resulting from the short-spaced detector 9.

In FIG. 4B, gating pulses are illustrated which are used with the long-spaced detector 13. The sync pulses 56, 57 and 58 are likewise separated from each other by a time interval of 1000 microseconds in the preferred embodiment. The gate pulses 59 and 60 are each approximately 900 microseconds long and commence approximately 100 microseconds following the sync pulse and each such gate pulse preferably terminates immediately before another neutron burst. Thus, the gate pulses 59 and 60 are set to occur during the interval of 100 to 1000 microseconds following the sync pulses 56 and 57, respectively. A similar such gating pulse (not illustrated) follows the sync pulse 58.

Referring now to FIG. 5, there is illustrated the subsurface circuitry for generating the sync and gate pulses illustrated in FIGS. 4A and 4B. The short-spaced detector 9 is coupled to an amplifier 61 whose output is connected into one input of a two-input AND gate 62. The long-spaced detector 13 is connected to an amplifier 63 whose output is connected to one input of a two-input AND gate 64. A clock circuit 65 has its output connected to a high voltage pulser 66 which drives the conventional neutron source 67. In the preferred embodiment of the present invention, the source 67 is a conventional D-T accelerator producing high energy 14 Mev neutrons at a rate as determined by the clock to produce pulses 1000 microseconds apart. The discrete bursts of neutrons are generally of 10 to 50 microseconds in duration. The clock 65 also drives a sync pulse generator 68 having its output connected to a junction 69 which is connected to one of the conductors of the logging cable 15 for transmission to the earth's surface. Clock 65 is also connected to delay circuits 70, 71, 72 and 73. The delay circuit 70 is set to have a delay of 100 microseconds. The output of the delay circuit 70 is coupled into a single shot multivibrator 74 which is driven by the delayed clock pulse into the second input of the AND gate 64. The single shot multivibrator 74 produces a square wave of 900 seconds in duration. This produces the gating pulse 59 illustrated in FIG. 4B. The delay circuit 71 creates a delay of 100 microseconds. The delay circuit 72 creates a delay of 400 microseconds, and the delay circuit 73 creates a delay of 700 microseconds. Each of the delay circuits 71, 72 and 73 are connected into the input of a single shot multivibrator 75 which generates a square wave pulse of 200 microseconds duration whose output is coupled into the second input of the AND gate 62. Thus, in turn, the delay circuit 71, the delay circuit 72 and the delay circuit 73, in conjunction with the single shot multivibrator 75, creates the gating pulses 53, 54 and 55, respectively. The output of the AND gate 62 is connected to a junction 76 which is connected to another one of the conductors in the logging cable 15. The output of the AND gate 64 is connected to the junction 77 which is connected to still another one of the conductors in the logging cable 15.

In the operation of the circuitry and apparatus illustrated in FIG. 5, the clock 65 causes the neutron source 67 to generate discrete bursts of neutrons, each of such bursts being separated by 1000 microseconds. The short-spaced detector 9 and the long-spaced detector 13 detect gamma radiation resulting from the capture of thermal neutrons occasioned in the formation surrounding the borehole by the neutron source 67. The detected pulses from the short-spaced detector 9 are amplified by the amplifier 61 and are passed through the AND gate 62 during the gate intervals 53, 54 and 55 occurring after each of the neutron bursts. In a similar manner, the radiation detected by the long-spaced detector 13 causes the electrical pulses to be amplified by amplifier 63 and are gated through the AND gate 64 in coincidence with the gates 59 and 60 occurring subsequent to each of the neutron bursts. Electrical signals indicative of the detected radiation are passed from the AND gates 62 and 64 to the points 76 and 77 for transmission to the earth's surface along with the sync pulses occurring at the terminal 69.

Figure 6:
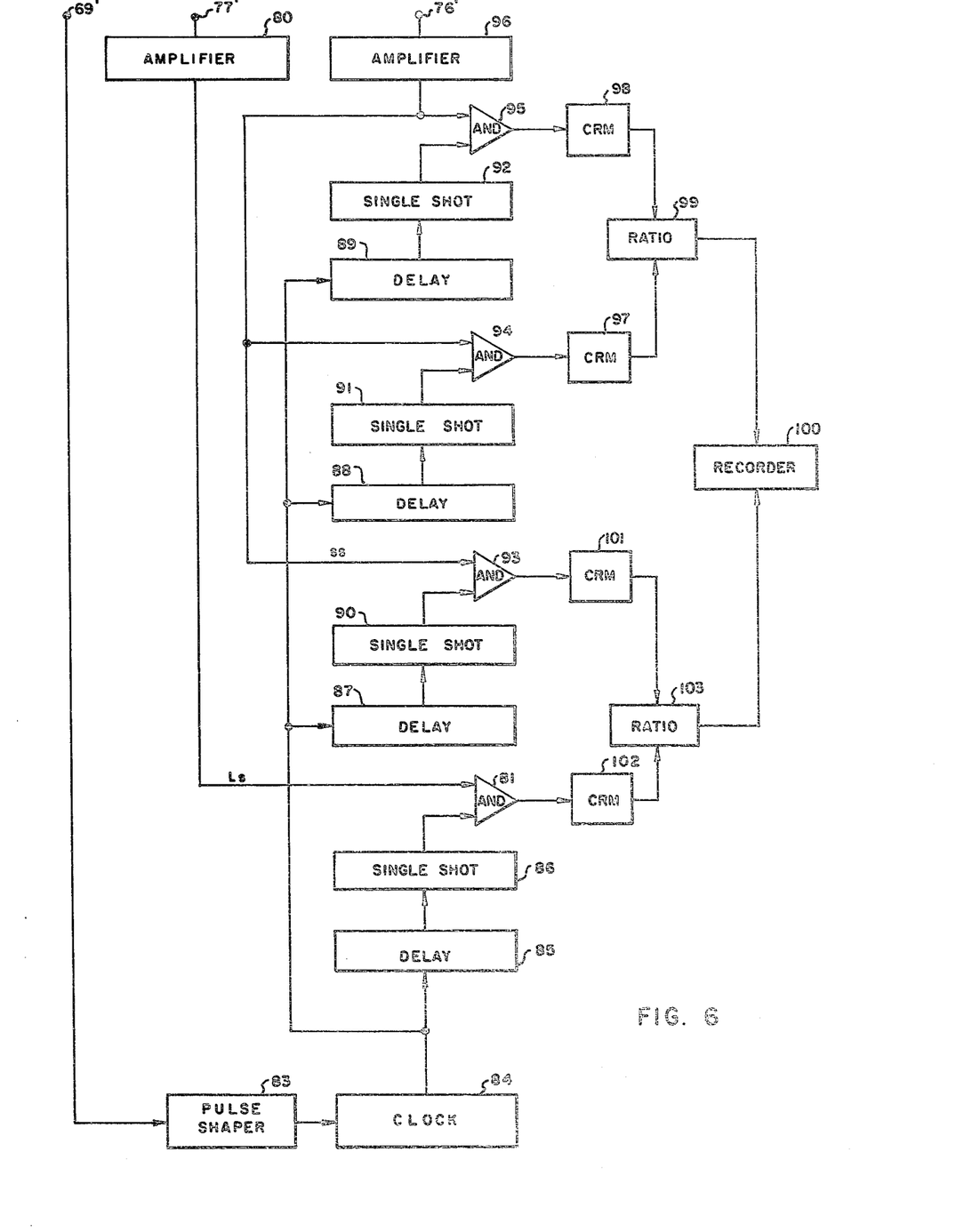
FIG. 6 illustrates in block diagram the surface electronics in accordance with the present invention.

Referring now to FIG. 6, the surface electronics shown generally by the reference numeral 20 in FIG. 1 is shown in greater detail. The junction 69' corresponds to the junction 69 in the subsurface circuitry. In a similar manner, the terminals 76' and 77' correspond to the terminals 76 and 77 in the subsurface circuitry, respectively. The junction 77' in the surface electronics is coupled through an amplifier 80 whose output is connected to one input of a two-input AND gate 81 whose output is connected to a count rate meter circuit 102. The junction 69' is connected to a pulse shaper circuit 83 whose output is connected to a clock circuit 84 which is synchronized to run at the same rate as the sync pulses occurring at the junction 69'. Thus, the clock circuit 84 is in synchronization with the subsurface clock 65 in a manner well known in the art. For example, if desired, a conventional phase-locked loop circuit (not illustrated) can be used to synchronize the clock 84 with the subsurface clock 65. The output of the clock circuit 84 is connected into a delay circuit 85 which in turn drives a single shot multivibrator 86 whose output is connected into the other input of the AND gate 81. The delay circuit 85 is set to create a delay of 100 microseconds, and the single shot multivibrator 86 generates a square wave having a duration of 900 microseconds. Thus, the delay circuit 85 and the single shot multivibrator 86 create a gating pulse at the surface which corresponds to the gating pulses 59 and 60 of FIG. 4B.

The clock circuit 84 is also connected to delay circuits 87, 88 and 89. The delay circuit 87 creates a delay of 100 microseconds. The delay circuit 88 creates a delay of 400 microseconds, and the delay circuit 89 creates a delay of 700 microseconds. The delay circuit 87 is connected into a single shot multivibrator 90. The delay circuit 88 is connected into a single shot multivibrator 91. The delay circuit 89 is connected into a single shot multivibrator 92. Each of the single shot multivibrator circuits 90, 91 and 92 generates square waves of 200 microseconds duration. The outputs of the single shot multivibrators 90, 91 and 92 are connected into the first inputs of AND gates 93, 94 and 95, respectively.

The junction 76' is connected through an amplifier 96 to the second inputs of the two-input AND gates 93, 94 and 95. The output of AND gate 94 is connected to a count rate meter 97 and the output of AND gate 95 is connected to a count rate meter 98. The outputs of the count rate meters 97 and 98 are connected to a conventional ratio circuit 99 whose output is recorded on the recorder 100.

The output of the AND gate 93 is connected to the count rate meter 101; the output of AND gate 81 is connected to a count rate meter circuit 102. The count rate meters 101 and 102 have their outputs connected to a ratio circuit 103 whose output is connected into the recorder 100.

In the operation of the surface electronics illustrated in FIG. 6, it should be readily apparent that the gating circuits are set up to coincide with the gating circuits of the subsurface electronics such that the radiation occasioned in the short-spaced detector 9 occurring during the gate interval 53 will be measured by the count rate meter circuit 101 in FIG. 6 and that the radiation occasioned within the long-spaced detector 13 and occurring during the gating interval 59 of FIG. 4B will be counted by the count rate meter circuit 102 and that the ratio as measured by the ratio circuit 103 of those two radiations is thus an indication of the formation porosity which is substantially independent of the borehole salinity. The count rate meters 97 and 98 measure a ratio of the radiation occasioned during the gating intervals 54 and 55 to provide a signal within the ratio circuit 99 indicative of the decline of the thermal neutron population which is likewise recorded on the recorder 100.

In utilizing the circuitry and apparatus hereinbefore described, it should be appreciated that the rate at which thermal neutrons die away in an earth formation after a burst of fast neutrons depends to a large extent on the characteristics of the formation fluids. The rate also may be different for each detector because of dissimilarity of source-to-detector spacing. Due to the fact that both detector measurements are time dependent, a large number of combinations are available, particularly if the ratio of one detector response to the other is considered.

One might expect that if enough time was allowed for borehole effects to die away for both detectors, for example, 350 to 1000 microseconds, then the ratio of the detected gamma rays from each detector would be a suitable porosity indication In fact, such a ratio is a suitable porosity indication but it is quite salinity-sensitive, which can only be overcome by interpretation with the aid of charts. I have found that when one measures in both detectors almost all the detected gamma rays occurring subsequent to the neutron burst, such a ratio has the greatest salinity effect with the ratio of 6 for 213 K ppm salt water and a ratio of 9 for fresh water at about 35% porosity. As the short-spaced measurement is narrowed in time, the salinity effect is decreased. I have found that with such a system, the optimum gating indicates that the long-spaced detector should be gated on for approximately the entire interval between the neutron bursts and that the short-spaced detector should be gated on fairly soon after the end of the neutron burst but only be left on for a fraction of the time during which the long-spaced detector is gated on. With such optimized gating, the porosity index is achieved which is quite independent of the formation salinity.

Wells in which porosity information has not been run are limited in the accuracy of water saturation calculations from a log indicative of the decline of the thermal neutron population. Porosity values in such wells have often been limited in the past to local depth trend charts and offset well porosity values. Water saturation values are in error if the porosity estimates chosen differ from the value that was actually present in a given well. However, the present invention allows such a log to be enhanced with a porosity curve which will suffice where porosity information is not available or can be used in lithology cross-plots when other porosity information is present. The outstanding characteristic about these ratio-derived porosity measurements is the minimal influence from formation and borehole fluids. The measurement from the system is a ratio of the long and short-spaced detector counting rates at preselected gate intervals. This ratio measurement is presented on a linear scale and is run simultaneously with the log indicative of the decline of the thermal neutron population. The ratio units can be converted to a sandstone porosity index through the use of a calibration chart. The dual detector system operates in an identical manner as the single detector system in its measurements of the decline of the thermal neutron population. Since both the single and dual detector systems measure the decline of the thermal neutron population in the same way, the following discussion places more emphasis on the ratio-derived porosity measurements since the measurement of the decline is strictly in accordance with the prior art as exemplified by the aforementioned U.S. Pat. No. 3,379,882 to Arthur H. Youmans.

The continuous measurement of the macroscopic absorption cross section by this system is performed by observing the time-rate of decay of the thermal neutron population. A pulsed source of fast neutrons is achieved by making use of the D-T reaction. The pulsing electronics is used as a timing signal for the detectors to observe the subsequent exponential decay of the thermal neutrons. Waiting an appropriate time (about 15 microseconds for most cases) insures that the remaining neutrons are thermal.

The application of nuclear theory to the measurement of the formation by this instrument in a borehole geometry results in a sensitivity to the borehole environment. Generally speaking, when making plots of the response of gamma ray detectors to the radiation following a neutron pulse, the data indicates that there is a non-exponential decay in the times following the neutron burst up to about 350 microseconds. After this, the decay becomes exponential. The overall decay curve has come to be described as a two component decay with the early, rapid decay being associated with borehole conditions. The method by which the present system measures the Sigma of the formation is by recording the counts observed during two different time intervals. The time rate of decay is then computed from these two quantities. Whether using the short-spaced or the long-spaced detector, the two responses are similar. However, the intensity in the long-spaced detector is much lower. This difference in intensity is at least partially due to the hydrogen concentration. The ratio of intensity has been shown to be sensitive to fluid-filled porosity.

The particular choice of timing wherein the short-spaced detector is gated on in an interval of 100 to 300 microseconds after the neutron burst and the long-spaced detector is gated on in an interval between 100 and 1000 microseconds after the neutron burst has been chosen as being optimum because it appears to be the least sensitive to the salinity concentration. A number of different time intervals for both the long and short-spaced detectors and their combinations have been investigated. As an example, the ratio response for short-spaced counts between 100 and 1000 microseconds and long-spaced counts between 100 and 1000 microseconds was found to be highly dependent upon the salinity. As previously set forth, the gating intervals have been optimized to provide for the interval of 100 to 300 microseconds after the neutron burst for the short-spaced detector and 100 to 1000 microseconds after the neutron burst for the long-spaced detector.

The theoretical description to be given concerning the ratio response to porosity is based upon the transport process for neutrons. It is assumed the ratio response does not exist because of some mechanism associated with the detection of gamma rays. That is to say, the gamma rays are solely a means of indirectly observing the neutron population.

Consider an ideal case described by an isotropic source situated within an infinite homogeneous medium with parameters equivalent to formations of interest. The initial cloud of thermal neutrons that are created has a density that is largely dependent upon the hydrogen concentration. Thus appropriate detectors at different spacings from the source would observe different neutron populations. Furthermore, the ratio of these observed population intensities would change as the hydrogen concentration changes.

The parameter of time cannot be ignored since the application is to a pulsed neutron system. It is also very difficult to separate the effect of time dependence and diffusion for pulsed cases. The simple statement that the ratio is only dependent upon the hydrogen concentration is categorically untrue. As an example, consider any given formation and the number of observed events at the long-spaced detector during the time interval 100 to 200 microseconds after the burst of neutrons. Under such conditions, an equivalent time interval for the short-spaced detector will give a ratio that is then dependent upon the time for which the gate is set (i.e., 100 to 200 microseconds will give different ratios than 300 to 400 microseconds). Gating both detectors to roughly the same time does not completely dissolve the ambiguity. In general, the longer the gate interval from the neutron burst, the more spatially uniform the neutron population due to the diffusion process.

The absorption properties of the formation can be envisioned to affect the ratio response although the hydrogen concentration remains unchanged. A more steeply spatially dependent neutron population intensity results from a more absorptive medium, at appropriate detection lengths. Data taken to date has partially substantiated this effect. It is well known that the salinity concentration as well as porosity affects the ratio response in most cases. However, it is not unreasonable to take the position that appropriate time gating can eliminate the absorption effect at least for some cases.

Borehole geometry may or may not have an effect upon the ratio response. For the present system, it is argued that observed counts, after about 300 microseconds from the fast neutron burst, are independent of borehole parameters. The same may hold true for the ratio. In any case, the borehole conditions are easier to correct for than formation parameters.

The depth of investigation of the ratio measurement is a function of the porosity and the hydrogen content of the material in the pour space and rock matrix. The high energy neutrons emitted by the pulsed neutron source are considerably stronger than the constant energy source used in other neutron source porosity devices; therefore, the depth of investigation will be somewhat deeper. For normal borehole environments, the depth of measurement will be approximately 13 to 19 inches.

Bed thickness is a function of logging speed, source-to-detector spacing, and time constant. With a normal logging speed of 20 feet per minutes and a time constant of 3 seconds, good porosity measurements can be made in beds thicker than 3.5 feet. It has been ascertained that the ratio curve made in accordance with the present invention has an excellent repeatability. Field test data shows that the ratio-derived porosity will repeat within three porosity units. The ratio porosity, a nuclear measurement, will be influenced by statistical fluctuation in the same manner. If exact measurements of porosity are necessary, several repeat runs can be accomplished.

Test pit data used when the gates have been optimized shows that only a minimal influence is exerted by borehole fluid salinity on the ratio curve measurement in accordance with the present invention. A change from fresh water to 150,000 ppm will reduce porosity by only 4½ porosity units.

The effects of formation fluids have a very minute effect of the ratio curve when made in accordance with the present invention. Very little porosity difference can be noticed between salt water and oil. The test pit data also shows a reduction in the oil effect on porosity measurements with the short-spaced detector gate set at 100 to 300 microseconds and the long-spaced detector gate set at 100 to 1000 microsecond gate setting. We did find that gate settings of 350 to 1000 microseconds on both the long and short-spaced detectors provide a porosity that is useful in lower porosity ranges up to 18%, but for porosity values from 18% to 35% it was not a very good chart. For one reason, the response is not a straight line. Field data proves that in these higher porosity values measured at the 350 to 1000 microsecond gate settings on both the long and short-spaced detectors, the data does not repeat, does not produce reliable values and were greatly affected by oil.

The field test data has shown that realistic porosity values are obtained when using the ratio-derived porosity in accordance with the present invention. This data was checked against various other porosity devices, sidewall cores and depth trend charts. Excellent porosity agreement has been achieved between the ratio-derived porosity in accordance with the present invention and the compensated neutron logging system used in the same well.

Of additional significance, it should be appreciated that when the ratio curve which is indicative of the porosity is drafted over the curve indicative of the decline of the thermal neutron population in a clean sand, any separation between the two curves will be an indication of hydrocarbons. This provides a quick look method but should not take the place of the detailed evaluation of the logs. The theory behind such a method is that gas and tight streaks will show less separation between the two curves than will oil sands.

It should be appreciated that tests have been run using a short-spaced gating interval of 100 to 300 microseconds on one particular instrument and that when using a smaller instrument, the short-spaced gating interval was set at 200 to 400 microseconds and the long-spaced interval was set at 200 to 1000 microseconds. Thus, since comparable results were achieved, optimization of the particular gating intervals for a particular sized tool and borehole through which it is run should be considered when utilizing the present invention. When using gates of 100 to 300 and 100 to 1000, the long-spaced gating interval is 4.5 times as long as the short-spaced interval. When using intervals of 200 to 400 and 200 to 1000, the long-spaced interval is 4.0 times as long as the short-spaced interval. Thus, I have found that the long-spaced interval should be approximately 4 to 5 times as long as the short-spaced interval.

In summary, a dual detector system has been developed in accordance with the present invention that provides a porosity indication much less affected by formation salinity than previous systems. The instruments have been run in an extremely large number of cases to increase their utility. What has been found to be most important in eliminating the salinity effect upon the porosity measurement is that of gating the long-spaced detector for approximately 80% to 90% of the entire interval between the neutron bursts and that the short-spaced detector is gated on only during an interval which is soon after the termination of the neutron burst, for a lesser time than that of the long-spaced gating interval but which does not occur so soon after the neutron burst as to be adversely affected by the inelastic radiation resulting from the neutron source being turned on.

Thus it should be appreciated that there has been described herein the preferred embodiment of the present invention wherein a vast improvement is provided for substantially eliminating the formation salinity effect upon a porosity log. Those skilled in the art will recognize, however, that modifications can be made to the disclosed embodiment without departing from the scope of the present invention.

The embodiments of the invention in which an exclusive property or privilege is claimed are defined as follows:

1. A method for logging the formations surrounding an earth borehole, comprising:
   pulsedly irradiating said formations with discrete bursts from a source of high energy neutrons;
   detecting radiations emanating from said irradiated formations at first and second points spaced from said source of high energy neutrons;
   generating electrical signals indicative of said detected radiations;
   gating the said electrical signals indicative of the radiation detected at said first point for a first time interval following each of said bursts of high energy neutrons;
   gating the said electrical signals indicative of the radiation detected at said second point for a second time interval following each of said bursts of high energy neutrons, said first time interval being of lesser duration than said second time interval; and
   combining said gated first and second electrical signals to produce an indication of the porosity of said formations.

2. The method according to claim 1 wherein said first radiation detector point is closer to said source of high energy neutrons than is said second radiation detector point.

3. The method according to claim 2 wherein said second time interval is of a duration substantially equal to 90% of the time between the discrete bursts of high energy neutrons.

4. The method according to claim 3 wherein said first time interval is of a duration substantially equal to 20% of the time between the discrete bursts of high energy neutrons.

5. The method according to claim 4 wherein the beginnings of said first and second time intervals coincide in time.

6. The method according to claim 5 wherein said bursts of high energy neutrons are 1000 microseconds apart, said first time interval occurs 100–300 microseconds after a given burst of high energy neutrons and said second interval occurs 100–1000 microseconds after a given burst of high energy neutrons.

7. The method according to claim 2 wherein said second time interval is of a duration substantially equal to 80% of the time between the discrete bursts of high energy neutrons.

8. The method according to claim 7 wherein said first time interval is of a duration substantially equal to 20% of the time between the discrete bursts of high energy neutrons.

9. The method according to claim 8 wherein the beginnings of said first and second time intervals coincide in time.

10. The method according to claim 9 wherein said bursts of high energy neutrons are 1000 microseconds apart, said first time interval occurs 200–400 microseconds after a given burst of high energy neutrons and said second interval occurs 200–1000 microseconds after a given burst of high energy neutrons.

11. The method according to claim 2 wherein said second time interval is approximately 4–5 times as long as said first time interval.

12. In a method of logging the formations surrounding an earth borehole using a pulsed source of high energy neutrons, a short-spaced radiation detector and a long-spaced radiation detector, the improvement comprising the gating of first electrical signals indicative of radiation detected by said first detector during a gate interval which is different from the time interval used in the gating of second electrical signals indicative of radiation detected by said second detector and by combining said first and second electrical signals to provide an indication of formation porosity.

13. The method according to claim 12 wherein said first and second electrical signals are combined in a ratio circuit.

14. The method according to claim 13 wherein the beginning points of said first and second time intervals are coincident.

15. The method according to claim 14 wherein said second time interval is approximately 4–5 times as long as said first time interval.

16. Apparatus for logging the formations surrounding an earth borehole, comprising:
   an elongated well logging instrument adapted to traverse an earth borehole;
   a source of pulsed high energy neutrons within said instrument;
   a first radiation detector within said instrument spaced by a given amount from said source;
   a second radiation detector within said instrument spaced from said source by an amount greater than said given amount;
   means for generating first electrical signals indicative of the radiation detected by said first detector;
   means for generating second electrical signals indicative of the radiation detected by said second detector;
   gating means for gating said first and second electrical pulses during first and second time intervals, respectively, said second time interval being different from said first time interval; and
   ratio means for combining said gated first and second electrical pulses to provide an indication of formation porosity.

17. The apparatus according to claim 16 wherein said second time interval is 4–5 times as long as said first time interval.

18. The apparatus according to claim 16 wherein said source generates discrete bursts of high energy neutrons having a time separation of 1000 microseconds, said first time interval is from 100–300 microseconds following each of said bursts and said second time interval is from 100–1000 microseconds following each of said bursts.

19. The apparatus according to claim 16 wherein said source generates discrete bursts of high energy neutrons having a time separation of 1000 microseconds, said first time interval is from 200–400 microseconds following each of said bursts and said second time interval is from 200–1000 microseconds following each of said bursts.

20. The apparatus according to claim 17 wherein the beginning points of said first and second time intervals are in coincidence.